Patented Feb. 1, 1938

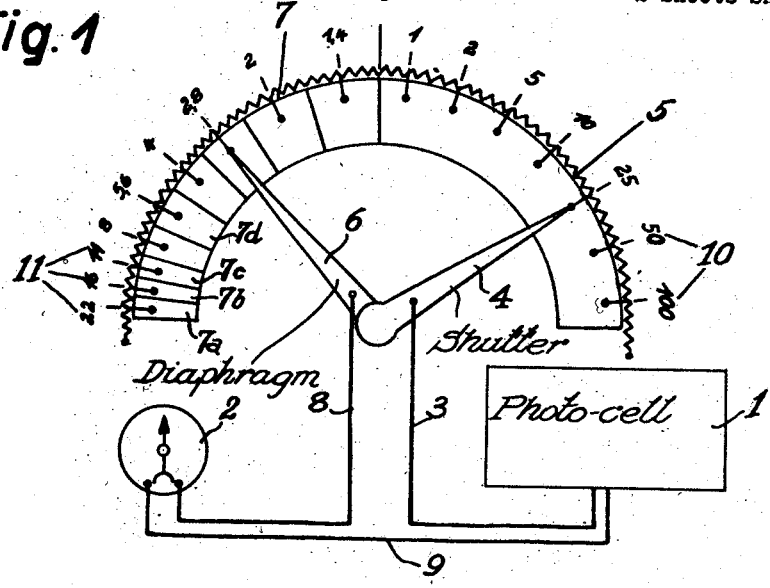
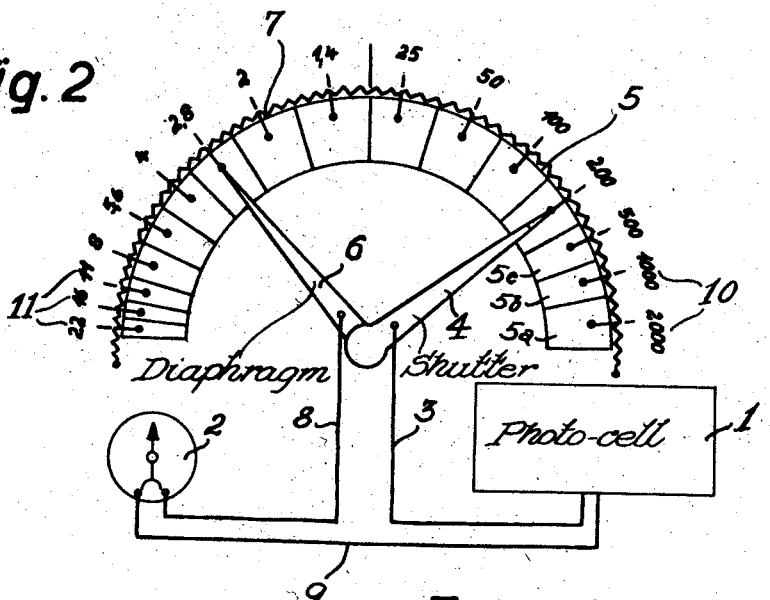

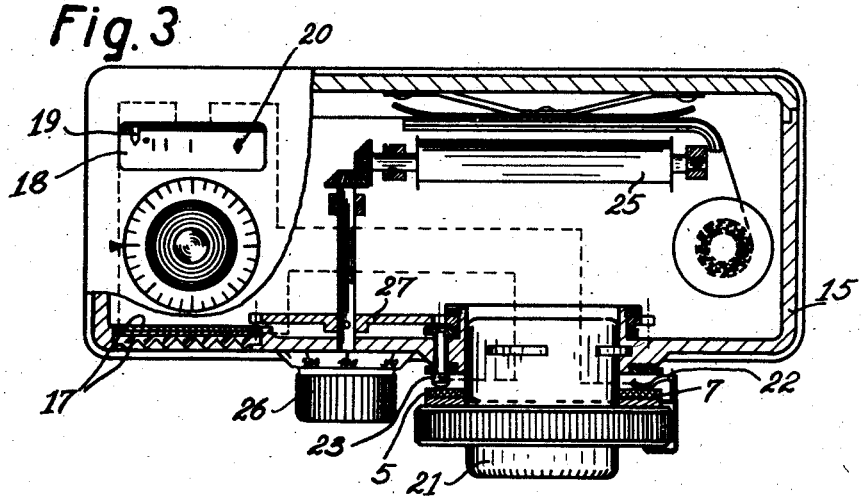
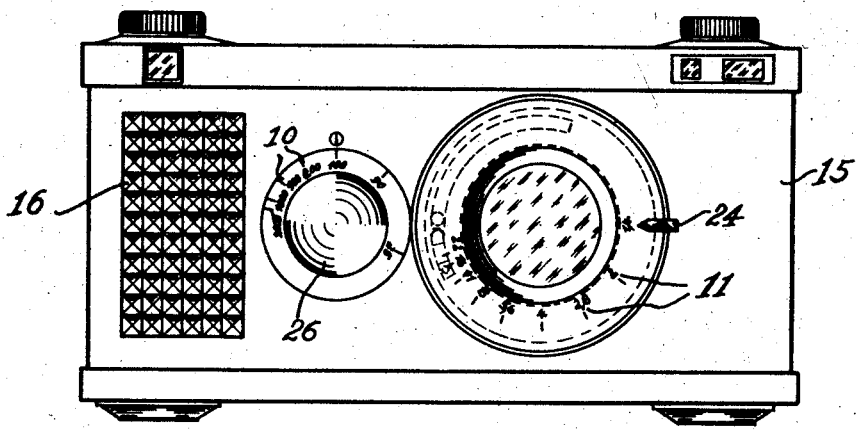

2,106,894

UNITED STATES PATENT OFFICE 2,106,894

PHOTOGRAPHIC CAMERA

Heinz Küppenbender, Dresden, Germany, assignor to Zeiss Ikon Aktiengesellschaft, Dresden, Germany Application September 20, 1935, Serial No. 41,390
In Germany August 16, 1934

6 Claims. (Cl. 95—10)

This invention relates to improvements in photographic cameras.

It pertains particularly to that type of cameras in which an electric photometer forms part of the equipment associated with the camera, the indication of the photometer being utilized for determining the setting of the diaphragm or of the shutter, or of both. In cameras of this type the mechanical setting means for the diaphragm may, for instance, be coupled with the electric photometer so as to cause an indicator in the circuit of the photometer to assume a predetermined position when the diaphragm has been set to the aperture called for by certain light conditions to which the photometer is responsive.

The instrument of the photometer is thereby subjected to circuit conditions resulting from uniform increments, positive or negative, in the value of the current, while the adjustments of the diaphragm are non-uniform. In the cameras of this type it was customary to provide a mechanical equalization means between the setting mechanism for the diaphragm and the means for varying the current conditions in the photometer to produce a uniform influence upon the instrument of the photometer in spite of non-uniform settings of the diaphragm.

Similarly also, it had been proposed to couple the mechanism for setting the shutter to predetermined speed values with the means for altering the position of the indicator of the photometer, whereby likewise the registration of the instrument of the photometer with a fixed mark on the same served as an indication that the proper setting of the shutter had been obtained.

It is an object of the present invention to eliminate in assemblies of this character mechanical means interposed between the diaphragm or shutter and the photometer respectively.

Another object of the invention is to provide a photographic camera having an electric photometer adapted to generate its own current upon energization by light, and having mechanical means for setting the diaphragm or the shutter or both and effect an equalizing coupling between the setting means of this part and the instrument of the photometer by electric means.

The invention also has the object of providing a camera of this character wherein the setting mechanism of the diaphragm or shutter alters the value of the resistance in the circuit of the photometer and effects a uniform alteration, a positive or negative increment of the current value of the photometer even though the successive settings of the shutter or diaphragm respectively are non-uniformly determined.

It is a further object of the invention to provide a camera of this character wherein the setting means for the diaphragm or shutter are adapted to engage successively and conductively resistance sections serially positioned in the circuit of the photometer, the length of adjustments for successive settings of the diaphragm or shutter being non-uniform, and hence also the length of contact between the setting means and the resistance sections being non-uniform, the resistance values, however, of these sections being uniform in spite of their unequal dimensions.

The invention, therefore, also has the object of interposing in a circuit of an electric photometer forming a part of a camera equipment, a plurality of resistance sections successively engageable by the setting means for the diaphragm or shutter, the conductors in the several resistance sections, however, having different coefficients of resistance for the purpose of making uniform the increments, positive or negative, in the current values of the photometer which are obtained by the proper setting of the diaphragm or shutter.

With these and numerous other objects in view, embodiments of the invention are shown in the accompanying drawings and described in the following specification which makes reference to the drawings.

In the drawings:

Fig. 1 shows diagrammatically the assembly of a photometer with setting means for the diaphragm and setting means for the shutter, wherein the successive adjustments of the diaphragm are non-uniform while the successive adjustments of the shutter are approximately uniform.

Fig. 2 shows diagrammatically a similar assembly of setting means for diaphragm and shutter with a photometer wherein, however, successive adjustments of both the diaphragm and the shutter for the proper aperture and speed values are non-uniform.

Fig. 3 shows in horizontal section and partly top plan view a camera equipped with a photometer and setting means for the diaphragm and shutter, and Fig. 4 is a front elevation of a camera of this character.

The electric photometer 1, Fig. 1, is of that type in which upon energization by light, an instrument 2 in the circuit of the photometer shows the deflections of a pointer depending upon the value of the current generated by the photometer. The conductor 3 extending from the photoelectric generator is shown associated with a setting means 4 illustrated diagrammatically as a pointer adapted to slide in contact with a resistance 5 which in Fig. 1 may be considered to be associated with the shutter equipment.

Another setting mechanism 6 for the diaphragm also is illustrated as a pointer which may be considered insulated from the setting mechanism 4 for the shutter and which also is adapted to sweep or slide in conductive relation over a resistance 7 associated with the diaphragm. From this second setting means a conductor 8 leads to the instrument 2 of the photometer, the circuit being closed by a return conductor 9. It will be obvious, therefore, that the current value in the circuit of the photo-electric generator and the instrument will be determined by the value of the resistance to which the setting means 4 and 6 have been adjusted.

The dial indications 10 and 11 for shutter and diaphragm respectively furthermore show that the gradations of the diaphragm dial are more lacking in uniformity than the gradations of the shutter dial which are approximately uniform in Fig. 1. Since it is desirable upon setting the diaphragm or shutter to different successive values to alter the current in the photometer circuit uniformly, the resistance sections 7a, 7b, 7c, etc., of which the resistance 7 is composed and which are respectively associated with the gradations of the diaphragm dial, are of nonuniform resistance value. The length of adjustment between the indications 2 and 1.4 on the diaphragm dial being considerably greater than the length of adjustment between the indications 22 and 16, it is obvious that the adjustments nearer the upper end of the diaphragm dial would induce greater increments in the current values than the adjustments nearer the lower end of the dial. For the purpose of equalizing these increments, the resistance sections associated with the various dial indications have been made nonuniform, for instance by making these sections of conductors having different coefficients of resistance. In this manner the unequal settings of the diaphragm are equalized in their influence upon the reading of the instrument 2.

In Fig. 2 illustrating a similar diagrammatic assembly, the setting mechanism 4 for the shutter is adapted to remain in sliding contact with serially disposed resistance sections 5a, 5b, 5c, etc., the ohmic values of which may be uniform in spite of the fact that the path of adjustment for successive settings is non-uniform. Here also the various sections 5a, 5b, 5c, etc., may, therefore, be made of conductors of different coefficients of resistance to produce upon successive settings of the shutter uniform increments, positive or negative, in the current values of the photometer circuit. The resistance 7 associated with the setting mechanism 6 for the diaphragm is subdivided into sections similarly to the showing of Fig. 1.

In incorporating this assembly with a photographic camera, the arrangement may be made by way of example as illustrated in Figs. 3 and 4. The casing 15 of the camera is shown equipped at the front wall with a transparent closure 16 overlying the layers 17 of materials which upon energization by light generate an electric current in conductors emanating from the end layers of the cell formed in this manner. An opening 18 preferably in the top wall of the camera permits the user to observe the position of a pointer 19 of an instrument influenced by the circuit in respect of a fixed mark 20, also visible through the opening 18.

The lens mounting 21 illustrated in Fig. 3 is of the readily detachable type permitting the use of selectively determined lenses as desired. The resistances 7 and 5 respectively are secured to the detachable lens mounting and are adapted to be contacted by wiping elements 22 and 23 respectively which may be assumed to be associated and to form part of the setting means for the diaphragm and for the shutter respectively. The setting means 22 for the diaphragm are mounted in cooperation with the dial indications 10 by means of a pointer 24 in a manner well known in the art. The shutter exemplified in the present instance by a slit shutter 25 is set by means of a button 26 preferably at the front wall of the camera in cooperation with a dial the values of which appear at 11. The button or knob 26 actuates upon manipulation a train of gears 27, 28 for imparting a proper sliding movement to the member 23 in relation with the resistance 5 attached to the camera mounting.

In the use of the camera the setting means 22 for the diaphragm is actuated to a predetermined aperture value, whereby the resistance of the circuit in the photometer is subjected to an alteration proceeding in uniform increments. The shutter setting means 26 is then manipulated until the pointer 19 observed by the user enters into registering position with the fixed mark 20 which then indicates that the proper adjustment of the shutter has been attained.

I claim:

1. In a photographic camera the combination of an electric photometer, a shutter coupled to the photometer, mechanical means movable over distances of varying lengths for setting the shutter to selective speed values, a dial having non-uniform gradations indicating said speed values, and electrical means for rendering uniform the increments in the current of the photometer upon adjustments of the shutter to successive speed values, said last named means being formed by resistance sections in the photometer circuit successively engageable by the shutter setting means and having non-uniform coefficients of resistance, the coefficients of resistance being reversely proportionate to the distance between each two successive dial gradations.

2. In a photographic camera the combination of an electric photometer, a shutter, means for setting the shutter selectively to different speed values, said shutter setting means being coupled with the photometer, a diaphragm, means for setting the diaphragm selectively to different aperture values, said diaphragm setting means being coupled with the photometer, dials indicating the speed values and aperture values respectively, each of the dials having non-uniform gradations, the coupling between said shutter setting means and the diaphragm setting means and the photometer respectively including serially connected sections of ohmic resistances in the photometer circuit successively engageable by the two setting means respectively, said ohmic resistance sections having non-uniform coefficients of resistance of such proportion to said non-uniform dial gradations that upon setting the shutter and diaphragm respectively upon successive gradations of their respective dials, the current alterations in the photometer circuit will be uniform.

3. In a photographic camera, the combination of an electric photometer, a lens system, means for adjusting the opening of said lens system, a shutter, means for adjusting the speed of said shutter, a photoelectric cell independently arranged of said adjusting means, a circuit therefor, and a resistance in said circuit, said two adjusting means comprising each an indicating member each having rigidly connected thereto a contact member in sliding engagement with said resistance, the resistances between any two consecutive positions of each of said indicating members being of equal ohmic value, and a measuring instrument in the circuit of said photometer for indicating the correct setting of said two adjusting means with respect to each other.

4. In a photometer for photographic cameras provided with exposure time adjusting means, a diaphragm and diaphragm adjusting means, a photoelectric cell, a circuit therefor, an ohmic resistance, a measuring instrument in said circuit, two contact members in sliding engagement with said resistance, one of said contacts being moved in coincidence with the displacement of the exposure time adjusting means of the photographic camera and the other contact member being moved in coincidence with the displacement of the diaphragm adjusting means, means for connecting said contact members with the photoelectric circuit, said measuring instrument being adapted to be adjusted to its zero position by corresponding adjustment of said two contact members, a dial having non-uniform gradations conforming to selected positions of the exposure time adjusting means and the diaphragm adjusting means respectively of the adjoined photographic camera, the resistance being subdivided in like manner as the dial into stages of different size, all stages being of equal ohmic value.

5. In a photometer for photographic cameras provided with two exposure adjusting means, namely one means for adjusting the opening of the camera lens and another means for adjusting the speed of the shutter; a photoelectric cell, a circuit therefor, an ohmic resistance, a measuring instrument in said circuit, two contact members in sliding engagement with said resistance, one of said contact members being mechanically connected with said lens adjusting means and the other contact member being mechanically connected with said shutter speed adjusting means, both contact members being moved in coincidence with the displacement of the respective exposure adjusting means of the photographic camera, means for connecting said contact members with the photoelectric circuit, said measuring instrument being adapted to be adjusted to its zero position by corresponding adjustment of said two contact members, a dial having non-uniform gradations conforming to selected positions of the said exposure adjusting means of the adjoined photographic camera, the resistance being subdivided in like manner as the dial into stages of different size, all stages being of equal ohmic value, said dial being so arranged, that the outside gradations correspond to extreme positions of the said exposure adjusting means.

6. In a photometer for photographic cameras provided with two exposure adjusting means, namely one means for adjusting the opening of the camera lens and another means for adjusting the speed of the shutter; a photoelectric cell, a circuit therefor, an ohmic resistance, a measuring instrument in said circuit, two contact members in sliding engagement with said resistance, one of said contact members being mechanically connected with said lens adjusting means and the other contact member being mechanically connected with said shutter speed adjusting means, both contact members being moved in coincidence with the displacement of the respective exposure adjusting means of the photographic camera, means for connecting said contact members with the photoelectric circuit, said measuring instrument being adapted to be adjusted to its zero position by corresponding adjustment of said contact members, a dial having non-uniform gradations conforming to selected positions of the said exposure adjusting means of the adjoined photographic camera, the resistance being subdivided in like manner as the dial into stages of different size, all stages being of equal ohmic value, said dial being so arranged that the gradations decrease from a common median zero point to the values corresponding to the shortest exposure time and the smallest opening of the camera lens respectively.

HEINZ KÜPPENBENDER.